United States Patent
Edwards et al.

(10) Patent No.: US 12,169,828 B2
(45) Date of Patent: Dec. 17, 2024

(54) SYSTEMS AND METHODS FOR OBFUSCATING TRANSACTIONS

(71) Applicant: Capital One Services, LLC, McLean, VA (US)

(72) Inventors: Joshua Edwards, Philadelphia, PA (US); Abdelkader Benkreira, New York, NY (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 496 days.

(21) Appl. No.: 17/001,457

(22) Filed: Aug. 24, 2020

(65) Prior Publication Data
US 2022/0058638 A1  Feb. 24, 2022

(51) Int. Cl.
*G06Q 20/38* (2012.01)
*G06Q 20/40* (2012.01)

(52) U.S. Cl.
CPC ......... *G06Q 20/382* (2013.01); *G06Q 20/401* (2013.01)

(58) Field of Classification Search
None
See application file for complete search history.

(56) References Cited

U.S. PATENT DOCUMENTS

| | | | |
|---|---|---|---|
| 9,065,643 B2 | 6/2015 | Hurry et al. | |
| 10,528,838 B1* | 1/2020 | Carter, Jr. | G06Q 20/042 |
| 11,151,468 B1* | 10/2021 | Chen | G06N 7/01 |
| 2008/0228637 A1* | 9/2008 | Scipioni | G06Q 40/02 705/35 |
| 2013/0080272 A1 | 3/2013 | Ronca et al. | |
| 2015/0206141 A1 | 7/2015 | Kurian | |
| 2017/0250972 A1* | 8/2017 | Ronda | H04L 9/0891 |
| 2019/0251199 A1* | 8/2019 | Klianev | G06Q 40/04 |
| 2020/0134616 A1* | 4/2020 | Rafalko | G06Q 10/10 |
| 2021/0027357 A1* | 1/2021 | Bonfigli | G06Q 30/0224 |
| 2021/0192521 A1* | 6/2021 | Barinov | G06Q 20/3821 |
| 2021/0201410 A1* | 7/2021 | Arnold | G06Q 40/04 |
| 2021/0357924 A1* | 11/2021 | Twing | H04L 9/3239 |

FOREIGN PATENT DOCUMENTS

EP    1265200 A1    12/2002

* cited by examiner

*Primary Examiner* — Chrystina E Zelaskiewicz
(74) *Attorney, Agent, or Firm* — Bookoff McAndrews, PLLC

(57) ABSTRACT

A computer-implemented method that includes receiving a user command including one or more criteria characteristics in association with an account and detecting an occurrence of a transaction from the account. The transaction is associated with one or more purchase characteristics. The method includes determining whether the one or more purchase characteristics of the transaction match the one or more criteria characteristics, and recording a modified version of the one or more purchase characteristics of the transaction on a ledger of the account in response to determining the one or more purchase characteristics match the one or more criteria characteristics. The method includes recording an unmodified version of the one or more purchase characteristics of the transaction on the ledger in response to determining the one or more purchase characteristics do not match the one or more criteria characteristics.

19 Claims, 4 Drawing Sheets

SYSTEMS AND METHODS FOR OBFUSCATING TRANSACTIONS

TECHNICAL FIELD

Various embodiments of the present disclosure relate generally to obfuscating transactions from a ledger, and relate particularly to methods and systems for selectively recording a modified or unmodified version of one or more purchase characteristics relating to a transaction.

BACKGROUND

When conducting certain transactions for goods and/or services, customers may desire to delay sharing knowledge of such transactions with other joint account holders of the same account. However, such other joint account holders may review a transaction ledger associated with the account or receive notifications of transactions which may reveal an occurrence of the transaction. Such ledgers or notifications may identify various data associated with the transaction, such as a description of the goods or services or the vendor providing the goods or services, a sale amount for the purchase of the goods or services, or a date and/or time of the transaction. Including information associated with the transaction on a ledger or notification may hinder the ability of customers in temporarily concealing an occurrence of the transaction from other joint account holders. For example, a customer seeking to purchase a gift with funds from an account of which the intended recipient of the gift is a joint account holder may wish to delay knowledge of the transaction to the intended recipient prior to the customer offering the gift to the intended recipient.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure methods, systems, and non-transitory computer-readable media are disclosed for modifying information on a financial transaction ledger. Each of the examples disclosed herein may include one or more of the features described in connection with any of the other disclosed examples.

In one example, a computer-implemented method may include receiving a user command including one or more criteria characteristics in association with an account; detecting an occurrence of a transaction from the account, wherein the transaction is associated with one or more purchase characteristics; determining whether the one or more purchase characteristics of the transaction match the one or more criteria characteristics; recording a modified version of the one or more purchase characteristics of the transaction on a ledger of the account in response to determining the one or more purchase characteristics match the one or more criteria characteristics; and recording an unmodified version of the one or more purchase characteristics of the transaction on the ledger in response to determining the one or more purchase characteristics do not match the one or more criteria characteristics.

In another example, a computer-implemented method may include receiving a user command to modify a transaction associated with an account, wherein the user command includes a defined duration and the transaction includes one or more purchase characteristics; altering the one or more purchase characteristics of the transaction to a modified version for inclusion on a ledger associated with the account; determining whether the defined duration has lapsed; in response to determining the defined duration has lapsed, altering the one or more purchase characteristics of the transaction to an unmodified version for inclusion on the ledger; and in response to determining the defined duration has not lapsed, periodically reassessing whether the defined duration has lapsed at a predetermined interval.

In a further example, a system may include a processor, and a memory storing instructions that, when executed by the processor, causes the processor to perform operations including: receiving a user command including one or more criteria characteristics in association with an account; detecting an occurrence of a transaction from the account, wherein the transaction is associated with one or more purchase characteristics; determining whether the one or more purchase characteristics of the transaction match the one or more criteria characteristics; recording a modified version of the one or more purchase characteristics of the transaction on a ledger of the account in response to determining the one or more purchase characteristics match the one or more criteria characteristics; and recording an unmodified version the one or more purchase characteristics of the transaction on the ledger in response to determining the one or more purchase characteristics do not match the one or more criteria characteristics.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
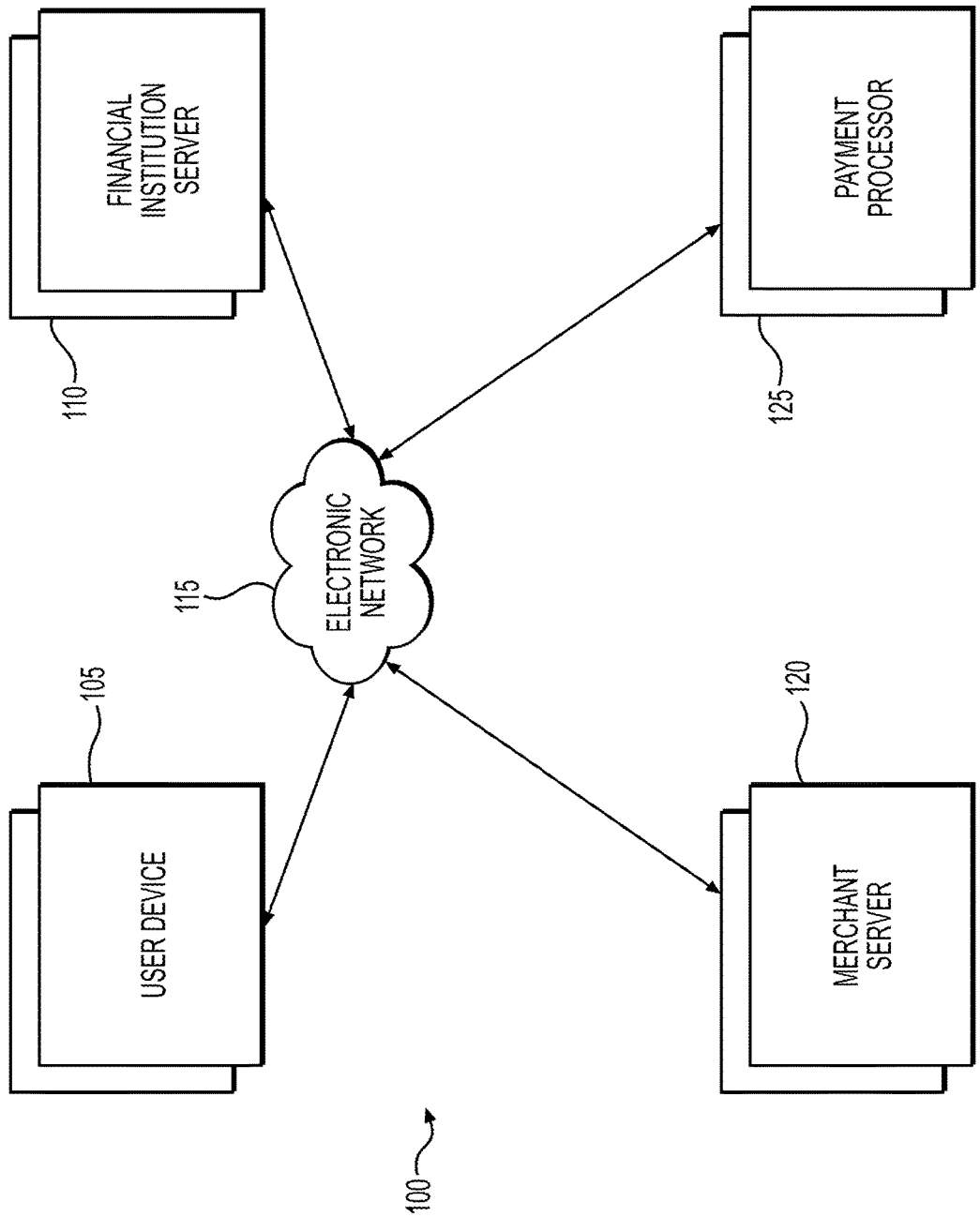
FIG. 1 depicts an exemplary client-server environment that may be utilized according to aspects of the present disclosure.

The terminology used in this disclosure is to be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "computer system" generally encompasses any device or combination of devices, each device having at least one processor that executes instructions from a memory medium. Additionally, a computer system may be included as a part of another computer system.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially," "approximately," "about," and "generally," are used to indicate a possible variation of ±10% of a stated or understood value.

As used herein, the term "merchant" may indicate, and may be used interchangeably with, a seller of items or services, a vendor of items or services, etc. The term "client" may indicate, and may be used interchangeably with, a customer, buyer, purchaser, person attempting to obtain ownership of a good (e.g., item) and/or service.

In general, the present disclosure provides methods and systems for using machine learning techniques to obfuscate a description of a transaction on a ledger. The term "ledger" as used herein may refer to a written collection or summary (e.g., electronic or paper) of a financial account for recording and totaling economic transactions that are measured in a monetary unit. As will be discussed in greater detail herein, existing techniques may be improved with the methods and systems of the present disclosure.

Clients may purchase certain goods or services (collectively referred to below as an "item") that they seek to give to a recipient who is a fellow (e.g., joint) account holder of the account utilized to acquire the good or service. Accordingly, the client may desire preventing disclosure of the transaction to the recipient until after the item is provided to the recipient. However, as an authorized account holder of the account used to purchase the item, the recipient may review a ledger associated with the account or receive a programmed notification of the transaction prior to the client providing the item to the recipient. Thus, the recipient may acquire knowledge of the transaction before the client has offered the item to the recipient. Such ledgers or notifications may identify various information associated with the transaction, thereby revealing identifying characteristics of the item purchased. Documenting information associated with the transaction on a ledger or notification may inhibit the client from surprising the recipient with the item at a time after the purchase. Accordingly, a need exists to provide retroactive capabilities of obfuscating information on a ledger associated with prior transactions. A need also exists to provide proactive capabilities of obfuscating future transactions from a ledger prior to the occurrence of the transaction based on various user-specified criteria.

FIG. 1 depicts an exemplary client-server environment that may be utilized with techniques presented herein. For example, the environment may include a system 100 with one or more user devices 105, one or more financial institution servers 110, one or more merchant servers 120, and one or more payment processors 125 in communication with one another across an electronic network 115. The one or more components of system 100 of FIG. 1 may communicate in any arrangement. User device 105 may be associated with a user, such as, for example, a user seeking to obfuscate information relating to a transaction. In other embodiments, it should be appreciated that payment processor 125 may be a unitary component with financial institution server 110.

The user may be a customer of one or more financial institutions and may have one or more consumer accounts with said financial institution(s). In this instance, the one or more consumer accounts may be stored on (or otherwise associated with) financial institution server 110 and the user may access the consumer accounts via user device 105, such as, for example, via an electronic application (e.g., a text messaging application, an e-commerce application, a social media application, or the like), an internet browser extension, or a website page. The user may conduct one or more transactions with the consumer account(s), such as, for example, purchasing a product, a good, or a service from one or more merchants, retailers, and the like. As described in greater detail herein, the user may access, review, and/or edit information relating to the one or more transactions conducted with the consumer account(s) via user device 105. In this instance, a ledger (e.g., an account summary, a financial report, an accounting log, a transaction overview, etc.) associated with the consumer account(s) stored on financial institution server 110 may be modified to at least partially obfuscate the one or more transactions. The ledger may be in various suitable formats, including, for example, an electronic version, a paper version, and more.

One or more of user device 105, financial institution server 110, merchant server 120, and/or payment processor 125 may communicate with each other over the electronic network 115 in executing a machine learning model to identify a transaction, determine certain obfuscation rules applicable to the transaction, and execute an obfuscation of information relating to the transaction. It should be appreciated that the term "obfuscating" may include various forms of revising, editing, modifying, and/or adjusting one or more details, data, or information relating to a transaction. As used herein, a "machine learning model" may include data (e.g., product data, vendor data, or historical customer data) or instruction(s) for generating, retrieving, and/or analyzing such data. In some embodiments, electronic network 115 may include a telecommunications network such that one or more of financial institution server 110, merchant server 120, and/or payment processor 125 may communicate with user device 105 over the telecommunications network, such as, for example, via a text messaging channel.

Still referring to FIG. 1, electronic network 115 may be a wide area network ("WAN"), a local area network ("LAN"), personal area network ("PAN"), or the like. In some embodiments, electronic network 115 includes the Internet, and information and data provided between various components of system 100 may occur online. "Online" may mean connecting to or accessing source data or information from a location remote from other devices or networks coupled to the internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web").

In other embodiments, electronic network 115 may be a telecommunications network, such as, for example, a telephone network, cellular network, or the like, or combinations thereof. In some embodiments, a text messaging channel may be embedded into, linked with, or configured to operate in conjunction with an electronic application operating on user device 105 and/or on electronic network 115.

While FIG. 1 depicts the various components of system 100 as physically separate and communicating across network 115, it should be appreciated that in other embodiments one or more components of system 100 may be incorporated partially or completely into any of the other components shown in FIG. 1. Some or all of the functionality of the machine learning model may be incorporated into one or more components of system 100, such as, for example, payment processor 125. Some or all of the functionality of payment processor 125 may be accessible via user device 105 and incorporated into a text messaging application, an internet browser extension, or website page.

Figure 2:
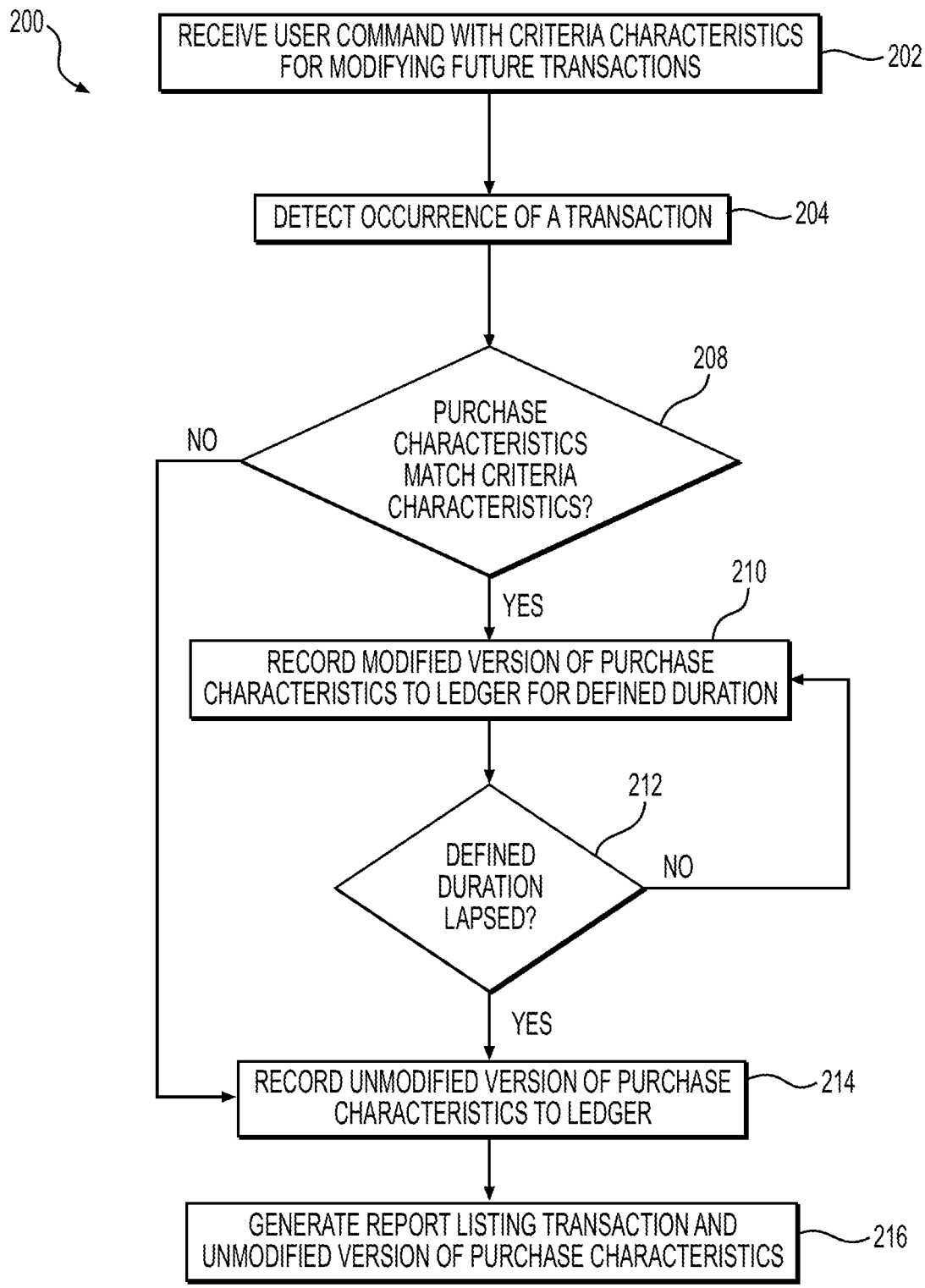
FIG. 2 depicts an exemplary process for proactively obfuscating transactions from a ledger.

FIG. 2 illustrates an exemplary process 200 for proactively obfuscating transactions using the system 100 of the present disclosure. Initially, at step 202, payment processor 125 (and/or financial institution server 110) may receive one or more user commands defining obfuscation rules for a particular consumer account. In some embodiments, the one or more user commands may include criteria characteristics in association with the particular consumer account. The criteria characteristics may include criteria characteristics for obfuscating certain transactions. For example, the one or more user commands may be received via an input at user device 105 and received by payment processor 125 (and/or financial institution server 110) through electronic network 115. The criteria characteristics may include information associated with and/or usable to identify prospective transactions. For example, the criteria characteristics may designate certain purchase characteristics of a transaction, including but not limited to, a product (e.g., good, service, etc.) name, a merchant name, a transaction date, a transaction time, a transaction identification number, a transaction amount (e.g., an estimated sale range), a merchant identification number, a merchant category code, a product description, a transaction description, an image, and more.

In this instance, with the criteria characteristics defined by the user and received by payment processor 125 (and/or financial institution server 110), system 100 may be configured to determine whether a transaction conducted by the user with the one or more consumer accounts qualify for obfuscation. As described in greater detail herein, a user may define a duration in which the obfuscation rules remain active when providing the user command at step 202 (e.g., via user device 105). In other embodiments, the obfuscation rules may remain operable until receiving a further (e.g., second) user command indicative of a manual deactivation of the obfuscation process 200.

At step 204, financial institution server 110 (and/or payment processor 125) may detect an occurrence of a transaction conducted with a consumer account. For example, a transaction may be detected by payment processor 125 in response to receiving transactional data indicative of a purchase made with the consumer account, such as from merchant server 120. In some embodiments, the consumer account may be communicatively coupled to a consumer card (e.g., credit card, debit card, etc.), a mobile payment application (e.g., on user device 105), and the like. Accordingly, completing a purchase may generate the transactional data thereby indicating an occurrence of the transaction. In some embodiments, the transactional data may include various information relating to the transaction.

For example, the transactional data may include one or more purchase characteristics (e.g., data fields) relating to the transaction. The one or more purchase characteristics may include, but is not limited to, a product (e.g., good, service, etc.) name, a merchant name, a transaction date, a transaction time, a transaction identification number, a transaction amount, a merchant identification number, a merchant category code, a product description, a transaction description, an image, and more.

At step 208, system 100 may be configured to determine whether the obfuscation rules created by the user are applicable to the detected transaction. That is, system 100 may be configured to determine whether the one or more purchase characteristics of the transaction match the one or more criteria characteristics by comparing the one or more purchase characteristics of the transaction with the one or more criteria characteristics defined by the user command. In some embodiments, the user command may be personalized such that the obfuscation rules are applied to the transaction when at least one of the criteria characteristics defined by the user match at least one of the purchase characteristics. In other embodiments, the user command may define a minimum threshold requirement for applying the obfuscation rules to a transaction. The transaction may be obfuscated when a degree of similarity between the criteria characteristics and the purchase characteristics of the transaction at least equals or exceeds the minimum threshold. By way of illustrative example, the minimum threshold may include two or more common characteristics between the criteria characteristics and the purchase characteristics. In some embodiments, the minimum threshold defined by the user command may require a complete (e.g., 100%) match between the one or more criteria characteristics selected by the user and the one or more purchase characteristics of the transaction.

In response to determining the criteria characteristics do not match the purchase characteristics at step 208 (e.g., step 208: NO), system 100 may record an unmodified version of the purchase characteristics onto a ledger at step 214. The ledger may be associated with the consumer account stored on financial institution server 110 and used to conduct the transaction detected at step 204. The transaction details generated by merchant server 120, and received by payment processor 125, may be maintained in an original format on the ledger of financial institution server 110 without adjusting the one or more purchase characteristics.

In response to determining the criteria characteristics do match the purchase characteristics at step 208 (e.g., step 208: YES), system 100 may record a modified version of the one or more purchase characteristics onto the ledger of financial institution server 110 at step 210. The transaction details generated by merchant server 120, and received by payment processor 125, may be adjusted relative to an original format of the one or more purchase characteristics. A form, extent, and/or type of adjustment of the one or more purchase characteristics may be determined by the obfuscation rules defined by the user command received at step 202. By way of example, system 100 may be configured to record one or more of a product (e.g., good, service, etc.) name, a merchant name, a transaction date, a transaction time, a transaction identification number, a transaction amount, a merchant identification number, a merchant category code, a product description, a transaction description, an image, and more with an alias that is personalized by the user or generated by system 100.

In some embodiments, the user may input (e.g., via user device 105) an alias identifier for one or more of the purchase characteristics to obfuscate the transaction. Thus, a modified version of the purchase characteristics is recorded onto the ledger of financial institution server 110 at step 210. The alias identifier may include a personalized text string determined by the user, such as, for example, including a customized merchant name, transaction amount, transaction time or date, and more. Alternatively, the alias identifier may include transaction data fetched from a transaction history of the consumer account, such as, for example, from one or more prior transactions recorded on financial institution server 110 and selectively identified by the user. Thus, the purchase characteristics of the subject transaction detected at step 204 may be replaced with purchase characteristics of the one or more prior transactions identified by the user, such that the subject transaction may resemble at least one prior transaction.

In other embodiments, system 100 may be configured to automatically determine the alias identifier by comparing purchase characteristics of the transaction to other transactions conducted from the consumer account (e.g., on financial institution server 110) to identify a substitute transaction for modifying the subject transaction. In this instance, system 100 may replace purchase characteristics of the subject transaction with at least a portion of the purchase characteristics of the substitute transaction to obfuscate the subject transaction detected at step 204. System 100 may be further configured to generate a list of alias recommendations regarding one or more of the purchase characteristics for selection by the user. The list of alias recommendations generated by system 100 may be determined based on one or more factors, such as, for example, one or more of the purchase characteristics of the transaction. By way of illustrative example, a list of alias recommendations for a merchant name may vary based on a transaction amount, a merchant category code, a transaction description, etc. of the subject transaction detected at step 204. In this manner, the process 200 may include a further step of receiving a user selection from the list of alias recommendations.

In one example, system 100 may include a machine learning algorithm (e.g., on or in communication with financial institution server 110, payment processor 125, etc.) that determines applicable merchant category codes based on a transaction amount of the subject transaction. The machine learning algorithm may further determine one or more merchants within a predetermined vicinity of the user (e.g., based on a GPS location of user device 105, a merchant location of the subject transaction received from merchant server 120, etc.) that correspond to the applicable merchant category codes. Accordingly, the list of alias recommendations may include local merchants that may retail goods and/or services for sale at a cost about the transaction amount. It should be appreciated that data relating to the one or more merchants (e.g., a merchant category code, a location, a retail cost of goods and/or services, etc.) may be received from merchant server 120 and/or stored on payment processor 125 from prior transaction history.

In other examples, system 100 may be configured to omit the one or more purchase characteristics from the ledger such that the transaction may be excluded from the ledger entirely. Alternatively, system 100 may be configured to visually redact the one or more purchase characteristics from the ledger such that the transaction may be included on the ledger and details of the transaction may be obfuscated. In this instance, an occurrence of the transaction may be identified upon a visual inspection of the ledger but at least one or more of the purchase characteristics of the transaction may be unidentifiable.

In addition to recording a modified version of the purchase characteristics onto the ledger at step 210, process 200 may include an optional step of determining whether the account is preprogrammed to transmit a push notification associated with the transaction (e.g., to display the purchase characteristics) upon detecting occurrence of the transaction. System 100 may be configured to modify the notification transmitted by payment processor 125 to user device 105 (e.g., and user device(s) 105 of any one or more joint account holders) in accordance with the obfuscation rules. For example, in some embodiments, a setup and/or setting of the consumer account stored on financial institution sever 110 may be programmed to transmit a notification (e.g., an alert transmitted to user device 105 via an SMS message, an audible message, electronic mail, etc.) to the user regarding occurrence of the transaction. The notification may include information relating to the transaction, such as the one or more purchase characteristics. Accordingly, the modified version of the purchase characteristics recorded on the ledger at step 210 may be included in the notification in lieu of the original, unmodified version of purchase characteristics. In this instance, the ledger and notification may maintain similar information regarding the subject transaction detected at step 204.

Additionally, system 100 may be configured to modify a balance of the ledger based on one or more user commands received from user device 105 at step 202. In some examples, the balance of the ledger may be modified to exclude the transaction amount of the obfuscated transaction, while in other examples the transaction amount may be included in the total balance due despite one or more purchase characteristics of the transaction being at least partially modified. For example, the total balance of the ledger may include the original, unmodified transaction amount when the individualized, modified transaction amount is displayed on the ledger. In a further example, the total balance of the ledger may include the original, unmodified transaction amount when a transaction is omitted entirely from the ledger.

As briefly discussed above, the obfuscation rules defined by the one or more user commands may further include a duration (e.g., user-defined duration) for implementing obfuscation of the one or more transaction(s) in accordance with the criteria characteristics. For example, the duration may specify various periods for actively maintaining the criteria characteristics in-force including, but not limited to, one (1) minute, one (1) hour, one (1) day, one (1) week, one (1) month, one (1) year, etc. It should be appreciated that various other suitable durations may be employed by system 100 other than those described herein without departing from the scope of this disclosure. Accordingly, the obfuscation process 200 may automatically terminate upon expiration of the duration.

In this instance, system 100 may be configured to monitor the duration that the obfuscation rules are applied to a particular transaction. Stated differently, system 100 may determine a duration lapse for recording the modified version of the purchase characteristics on the ledger. System 100 may determine whether the defined duration has lapsed at step 212 and, in response to determining the defined duration has not lapsed (e.g., step 212: NO), maintain the modified purchase characteristics on the ledger. Alternatively, in response to determining the defined duration has lapsed at step 212 (e.g., step 212: YES), system 100 may be configured to remove the modified version of the purchase characteristics from the ledger and record an unmodified version of the purchase characteristics at step 214. In this instance, the original purchase characteristics of the transaction detected at step 204 may be populated onto the ledger so as to replace the modified purchase characteristics recorded thereon during the defined duration.

In other embodiments, the obfuscation rules defined by the one or more user commands at step 202 may include a defined release date in lieu of the defined duration described above. In this instance, system 100 may periodically determine whether a current date equals the defined release date prior to updating the ledger with the unmodified version of the purchase characteristics. In some embodiments, the user command received by user device 105 may define the obfuscation rules indefinitely such that step 212 of process 200 may be omitted entirely. System 100 may be configured to provide a periodic notification to the user (e.g., via user device 105) with a message alerting the user to the continued implementation of the obfuscation rules associated with the consumer account on financial institution server 110.

At step 216, system 100 may be configured to generate a report that includes a list of one or more transactions that may have been at least partially obfuscated during the defined duration. The report may further include the unmodified version of the purchase characteristics for each of the one or more transactions listed in the report. In some embodiments, the report may be made accessible for review through user device 105 (e.g., via an electronic application, an internet browser extension, or a website page).

Further, a notification may be generated and transmitted to user device 105 indicating existence of the report and identifying the one or more transactions that were previously obfuscated. In other embodiments, a hardcopy of the report may be printed and included as an appendix to a monthly ledger mailed to the user in paper format. In embodiments in which a third-party may access a ledger of consumer accounts on financial institution server 110, a report and/or notification may be generated and transmitted to the third-party for accurate record-keeping purposes. Additionally and/or alternatively, the updated ledger of the consumer account may include one or more notations (e.g., a symbol, an asterisk, a highlight, an annotation, etc.) to indicate a transaction that has been updated relative to a modified version.

It should be appreciated that system 100 may be configured to automatically implement the exemplary process 200 shown and described above based on one or more predefined parameters. The one or more predefined parameters may include purchase characteristics of a transaction received by payment processor 125 from merchant server 120. For example, the one or more predefined parameters may include, but is not limited to, a current date (e.g., a birthday, an anniversary, a holiday, etc.), a merchant name (e.g., a particular retailer), a merchant category code (e.g., florist, jewelry, bakery, etc.), and more. The obfuscation rules (e.g., criteria characteristics, predefined duration, etc.) may be preprogrammed and the exemplary process 200 triggered upon detection of the one or more predefined parameters.

In some embodiments, the exemplary process 200 may be implemented by the user for a consumer account of a second user when the user shares access to the consumer account of the second user (e.g., when the user and the second user are joint account holders of the consumer account). In this instance, the user may utilize system 100 to obfuscate one or more transactions conducted on the consumer account by the user and/or by the second user. In some embodiments, a functional capability of system 100, in accordance with the exemplary process 200 shown and described above, may be selectively disabled by the user. In other embodiments, the user may disable implementation of the exemplary process 200 for transactions having one or more predefined purchase characteristics (e.g., a merchant name, a transaction amount, a merchant category code, etc.), such as, for example, transactions involving the purchase of alcohol, gambling, medical prescriptions, and more. In a further exemplary use case, the user may restrict the functionality of the exemplary process 200 to retail transactions to inhibit obfuscation of transactions relating to business dealings.

Figure 3:
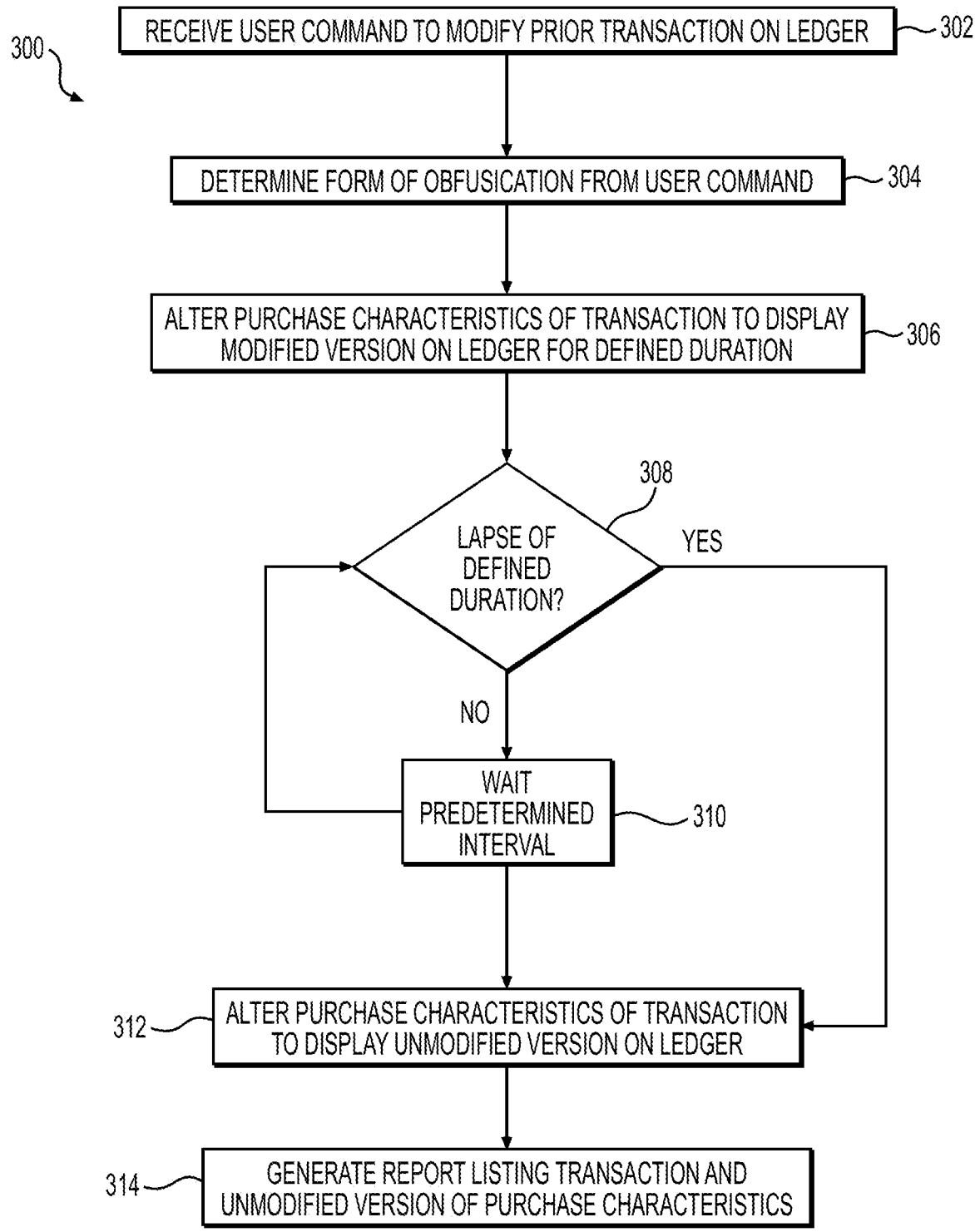
FIG. 3 depicts an exemplary process for retroactively obfuscating transactions from a ledger.

FIG. 3 illustrates an exemplary process 300 for retroactively obfuscating transactions using system 100 of the present disclosure. Initially, at step 302, payment processor 125 (and/or financial institution server 110) may receive one or more user commands to modify a transaction associated with an account, where the one or more user commands may include a defined duration and where the transaction includes one or more purchase characteristics. That is, step 302 may include identifying an existing transaction previously conducted on a consumer account for obfuscation. It should be appreciated that the user command at step 302 may identify multiple transactions for obfuscation across one or more consumer accounts. For example, the user command may include a manual selection of the one or more transactions stored on financial institution server 110. In another example, the user command may include an input of one or more criteria characteristics for identifying the particular transaction(s) in the consumer account for obfuscation. The user commands may be inputted via user device 105 and received by payment processor 125 (and/or financial institution server 110) through electronic network 115.

The one or more user commands may further include a format instruction, and process 200 may optionally include, at step 304, determining a format of obfuscation from the user command received at step 302. For example, the format instruction may define one or more types of obfuscation, including but not limited to, a redaction, a modification (e.g., user-defined, computer-generated, etc.), an omission, and more. Additionally, the format instruction may be directed toward certain purchase characteristics of a transaction, including but not limited to, a product (e.g., good, service, etc.) name, a merchant name, a transaction date, a transaction time, a transaction identification number, a transaction amount (e.g., an estimated sale range), a merchant identification number, a merchant category code, a product description, a transaction description, an image, and more. In this instance, the format instruction may define a type of obfuscation to perform for a particular purchase characteristics. It should be appreciated that the user command at step 302 may include similar and/or different format instructions for each of the one or more purchase characteristics of a transaction.

At step 306, system 100 may alter one or more purchase characteristics of the transaction to a modified version for inclusion on a ledger associated with the account. The modified version of the one or more purchase characteristics may be altered relative to an original version of the purchase characteristics and may be displayed on the ledger for a defined duration. As described in detail above, the defined duration may specify various periods for actively maintaining obfuscation of the transaction selected at step 302.

System 100 may determine whether the defined duration has lapsed at step 308 and, in response to determining the defined duration has not lapsed (e.g., step 308: NO), maintain the modified purchase characteristics on the ledger. At step 310, system 100 may be configured to wait a predetermined interval prior to returning to step 308 to determine whether the defined duration has lapsed. For example, the predetermined interval may include a duration ranging from about one (1) minute, one (1) hour, one (1) day, one (1) week, one (1) month, etc. Alternatively, in response to determining the defined duration has lapsed at step 308 (e.g., step 308: YES), system 100 may be configured to remove the modified version of the purchase characteristics from the ledger and record an unmodified version of the purchase characteristics at step 312. In this instance, the original purchase characteristics of the transaction initially recorded on the ledger prior to receiving the user command at step 302 may be returned onto the ledger so as to replace the modified purchase characteristics recorded thereon during the defined duration.

At step 314, system 100 may be configured to generate a report that includes a list of the obfuscated transaction(s) and/or the unmodified version of the purchase characteristics the obfuscated transaction(s). A notification may be transmitted to user device 105 alerting the user to the report and/or identifying the obfuscated transaction(s). It should be appreciated that system 100 may be configured to automatically implement the exemplary process 300 shown and described above upon receiving the user command at step 302. The transaction identified at step 302 from financial institution server 110 may be at various processing stages, such as, for example, an initial authorization stage, a pending stage, a posted stage, and a paid stage.

In some instances, the user command at step 302 may be received prior to occurrence of the transaction such that system 100 determines the applicable transaction for obfuscation when detecting an occurrence of a transaction within a predetermined period (e.g., one second, one minute, one hour, one day, etc.) after receiving the user command. For example, in some embodiments, the user may activate process 300 by actuating a trigger (e.g., a button, an icon, a dial, etc.) via user device 105 indicating application of the obfuscation process to any ensuing transaction(s) processed by payment processor 125. Payment processor 125 may be configured to implement the obfuscation process 300 for any transaction(s) processed within the predetermined period while simultaneously forgoing obfuscation of detected transactions deemed to be routine.

Stated differently, it may be possible that one or more routine and/or periodic transactions (e.g., hourly, daily, weekly, monthly, annually, etc.) are coincidentally processed by payment processor 125 during the predetermined period. System 100 may be configured to identify and omit obfuscation of said regularly-scheduled transaction(s) occurring during the predetermined period. In some embodiments, system 100 (e.g., payment processor 125, financial institution server 110, etc.) deploys a machine learning model configured to determine one or more routine transactions occurring during the predetermined period. Any acceptable machine learning technique may be used. In some embodiments, the machine learning model is trained to learn associations between routine transactions from one or more transactions targeted for obfuscation.

The execution of the machine learning model may include deployment of one or more machine learning techniques, such as linear regression, logistical regression, random forest, gradient boosted machine (GBM), and/or a deep neural network. Supervised or unsupervised training may be employed. For example, unsupervised approaches may include K-means clustering. K-Nearest Neighbors may also be used, which may be supervised or unsupervised. Combinations of K-Nearest Neighbors and an unsupervised cluster technique may also be used.

It should be appreciated that a user(s) of system 100 may be required to acknowledge and/or accept a notice generated by system 100 disclaiming the prospective application of the one or more obfuscation rules described herein when agreeing to use system 100. That is, system 100 may be configured to notify the one or more users of the various obfuscation functionalities shown herein during an initial registration or onboarding process. System 100 may require an affirmative acceptance by the one or more users of such terms and conditions prior to receiving access to the financial institution account(s) associated with system 100. Accordingly, the user(s) may be required to accept possible obfuscation of an account ledger during use and/or ownership of the account with the financial institution.

Figure 4:
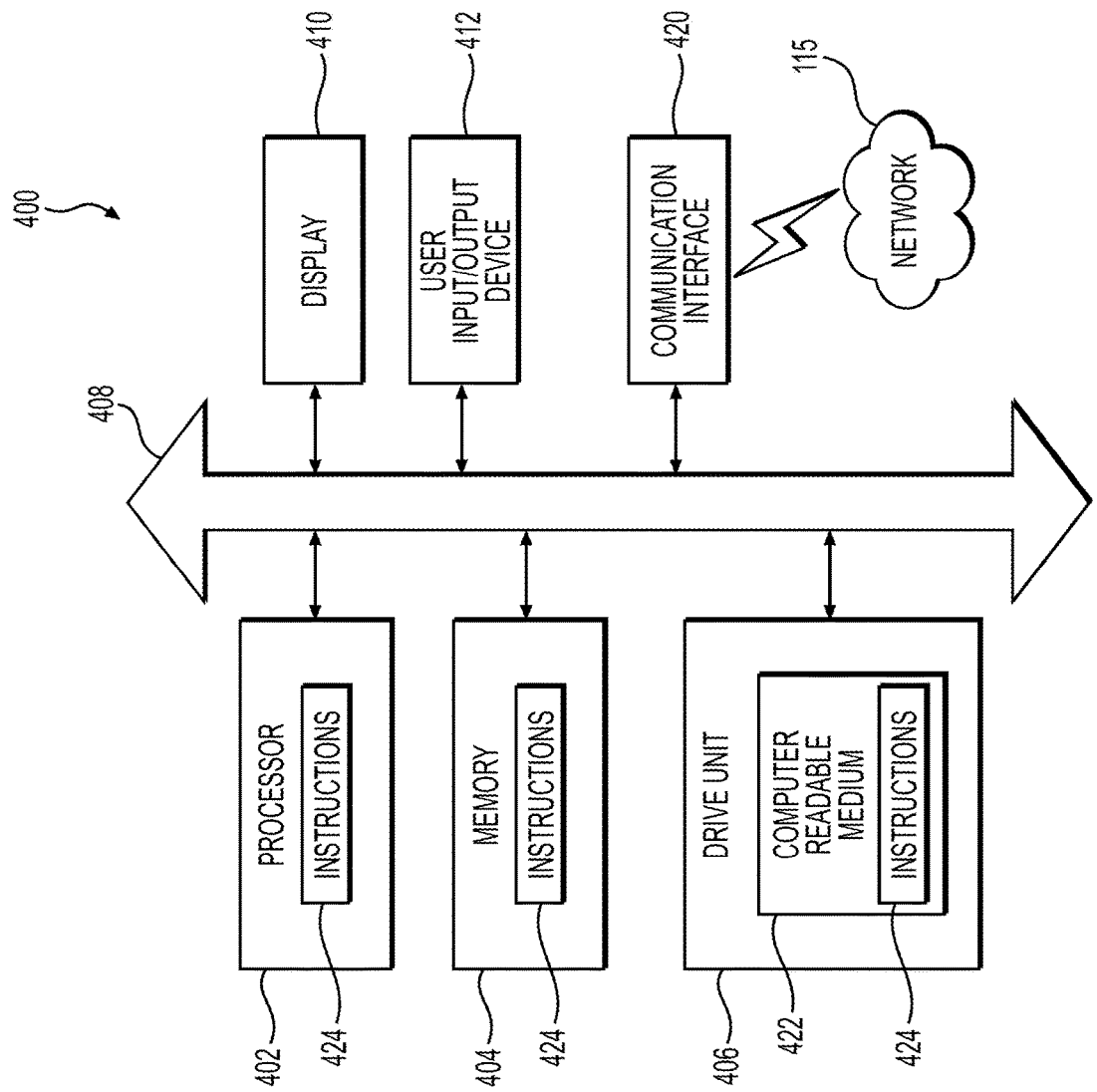
FIG. 4 depicts an example of a computing device, according to aspects of the present disclosure.

FIG. 4 is a simplified functional block diagram of a computing device 400 that may be configured as a device for executing the methods of FIGS. 2-3, according to exemplary embodiments of the present disclosure. Any of the devices, servers, processors, etc. of system 100 discussed herein may be an assembly of the hardware of computing device 400 including, for example, user device 105, financial institution server 110, merchant server 120, and/or payment processor 125 according to exemplary embodiments of the present disclosure.

Computing device 400 may include a central processing unit ("CPU") 402 that may be in the form of one or more processors configured to execute program instructions, such as those of processes 200, 300 described in detail above. In some embodiments, the processor(s) of CPU 402 includes both a CPU and a GPU. Computing device 400 may further include a storage unit 406 that may include non-volatile memory, such as, for example, a storage media (e.g., solid-state drives), ROM, HDD, SDD, etc. Examples of storage media include solid-state storage media (e.g., solid state drives and/or removable flash memory), optical storage media (e.g., optical discs), and/or magnetic storage media (e.g., hard disk drives). Storage unit 406 may store data on a computer readable medium 422. In some embodiments, computing device 400 may receive programming and data via network communications from electronic network 115, such as, for example, via a communication interface 420 configured to communicate with one or more other components of system 100.

Still referring to FIG. 4, computing device 400 may include a memory 404 that is volatile memory, such as, for example, RAM, solid-state memories, optical storage media (e.g., optical discs), magnetic storage media (e.g., hard disk drives), etc. Memory 404 may be configured for storing one or more instructions 424 for executing techniques presented herein, such as those of processes 200, 300 shown and described above. Memory 404 may further include a non-transitory computer-readable medium. Therefore, whenever a computer-implemented method is described in this disclosure, this disclosure shall also be understood as describing a non-transitory computer-readable medium storing instructions that, when executed by one or more processors (e.g., CPU 402), cause the one or more processors to perform the computer-implemented method.

In some embodiments, the one or more instructions 424 may be stored temporarily or permanently within other modules of computing device 400, such as, for example, CPU 402, computer readable medium 422, and more. Computing device 400 may include an input/output device 412 including one or more input ports and one or more output ports. Input/output device 412 may include, for example, a keyboard, a mouse, a touchscreen, etc. (i.e., input ports). Input/output device 412 may further include a monitor, a display, a printer, etc. (i.e. output ports). Computing device 400 may further include a display device 410 configured to connect with input/output device 412. The aforementioned elements of computing device 400 may be connected to one another through an internal communication bus 408, which represents one or more busses.

In other embodiments, the various system functions of processes 200, 300 shown in FIGS. 2-3 may be implemented in a distributed fashion on a number of similar platforms to distribute the processing load on multiple computing devices 400. Alternatively, the system functions may be implemented by appropriate programming of one computer hardware platform, such as, for example, computing device 400.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming.

All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer. Also, the presently disclosed embodiments may be applicable to any type of Internet protocol. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to, the processes shown in FIGS. 2-3, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above-disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method, comprising:
   receiving a user command including a plurality of criteria characteristics in association with an account, wherein the plurality of criteria characteristics includes a first product description and a first merchant category code, the account is associated with an entity which provides a ledger of the account to a user, and the user and a second user are joint account holders of the account;
   detecting an occurrence of a transaction from the account using a machine learning model, wherein the transaction is associated with a plurality of purchase characteristics including a second product description and a second merchant category code;

determining, using the machine learning model, whether the plurality of purchase characteristics included in the second product description and the second merchant category code match the plurality of criteria characteristics included in the first product description and the first merchant category code;

performing a ledger process using the machine learning model, the ledger process including:

recording a modified version of the plurality of purchase characteristics of the transaction on the ledger of the account for a defined time duration, in response to determining the plurality of purchase characteristics included in the second product description and the second merchant category code match the plurality of criteria characteristics included in the first product description and the first merchant category code, wherein the recording of the modified version of the matching plurality of purchase characteristics included in the second product description and the second merchant category code conceals the transaction from the second user; or recording an unmodified version of the plurality of purchase characteristics of the transaction on the ledger of the account, in response to determining the plurality of purchase characteristics included in the second product description and the second merchant category code do not match the plurality of criteria characteristics included in the first product description and the first merchant category code;

determining whether the account is associated with a preprogrammed instruction to transmit a push notification associated with the transaction upon detecting the occurrence of the transaction;

in response to determining the account is associated with the preprogrammed instruction to transmit the push notification, modifying the push notification to include the modified version of the plurality of purchase characteristics; and executing the preprogrammed instruction to transmit the push notification to a user device.

2. The computer-implemented method of claim 1, wherein recording the modified version of the plurality of purchase characteristics comprises:

obfuscating at least one of the plurality of purchase characteristics of the transaction on the ledger.

3. The computer-implemented method of claim 2, wherein recording the modified version of the plurality of purchase characteristics further comprises at least one of:

modifying a merchant name field associated with the transaction on the ledger;

modifying a transaction date field associated with the transaction on the ledger;

modifying a transaction amount field associated with the transaction on the ledger; or modifying the second merchant category code associated with the transaction on the ledger.

4. The computer-implemented method of claim 1, wherein recording the modified version of the plurality of purchase characteristics on the ledger comprises:

replacing the plurality of purchase characteristics with an alias characteristic.

5. The computer-implemented method of claim 4, wherein prior to replacing the plurality of purchase characteristics with the alias characteristic, the method comprises:

determining one or more alias characteristic recommendations from prior transaction data associated with the account, wherein the one or more alias characteristic recommendations are based on a comparison with the plurality of purchase characteristics.

6. The computer-implemented method of claim 5, wherein replacing the plurality of purchase characteristics with the alias characteristic comprises:

generating a list of the one or more alias characteristic recommendations; and transmitting the list to the user device for selection of at least one of the one or more alias characteristic recommendations.

7. The computer-implemented method of claim 1, wherein:

the user command including the plurality of criteria characteristics is received from the user device via an electronic network; and the plurality of purchase characteristics associated with the transaction is received from a merchant server.

8. The computer-implemented method of claim 1, wherein the user command includes a duration for associating the plurality of criteria characteristics with the account, and the method further comprising:

periodically determining whether the duration has lapsed.

9. The computer-implemented method of claim 8, further comprising:

removing the plurality of criteria characteristics from association with the account when the duration has lapsed such that determining whether the plurality of purchase characteristics included in the second product description and the second merchant category code match the plurality of criteria characteristics included in the first product description and the first merchant category code is ceased when detecting the occurrence of the transaction.

10. The computer-implemented method of claim 8, further comprising:

modifying the ledger of the account to update the plurality of purchase characteristics of the transaction from the modified version to the unmodified version in response to determining the duration has lapsed.

11. The computer-implemented method of claim 8, further comprising:

generating a report listing the transaction with the plurality of purchase characteristics in the unmodified version in response to determining the duration has lapsed.

12. The computer-implemented method of claim 1, wherein recording the modified version of the plurality of purchase characteristics on the ledger comprises:

omitting the plurality of purchase characteristics of the transaction from the ledger of the account such that the transaction is excluded from the ledger.

13. A system, comprising:

a processor; and a memory storing instructions that, when executed by the processor, cause the processor to perform operations including:

receiving a user command including a plurality of criteria characteristics in association with an account, wherein the plurality of criteria characteristics includes a first product description and a first merchant category code, the account is associated with an entity which provides a ledger of the account to a user, and the user and a second user are joint account holders of the account;

detecting an occurrence of a transaction from the account using a machine learning model, wherein the transaction is associated with a plurality of purchase characteristics including a second product description and a second merchant category code;
determining, using the machine learning model, whether the plurality of purchase characteristics included in the second product description and the second merchant category code match the plurality of criteria characteristics included in the first product description and the first merchant category code;
performing a ledger process using the machine learning model, the ledger process including:
  recording a modified version of the plurality of purchase characteristics of the transaction on the ledger of the account for a defined time duration, in response to determining the plurality of purchase characteristics included in the second product description and the second merchant category code match the plurality of criteria characteristics included in the first product description and the first merchant category code, wherein the recording of the modified version of the matching plurality of purchase characteristics included in the second product description and the second merchant category code conceals the transaction from the second user; or
  recording an unmodified version of the plurality of purchase characteristics of the transaction on the ledger of the account, in response to determining the plurality of purchase characteristics included in the second product description and the second merchant category code do not match the plurality of criteria characteristics included in the first product description and the first merchant category code;
determining whether the account is associated with a preprogrammed instruction to transmit a push notification associated with the transaction upon detecting the occurrence of the transaction;
in response to determining the account is associated with the preprogrammed instruction to transmit the push notification, modifying the push notification to include the modified version of the plurality of purchase characteristics; and
executing the preprogrammed instruction to transmit the push notification to a user device.

14. The system of claim 13, wherein recording the modified version of the plurality of purchase characteristics comprises:
  obfuscating at least one of the plurality of purchase characteristics of the transaction on the ledger.

15. The system of claim 14, wherein recording the modified version of the plurality of purchase characteristics further comprises at least one of:
  modifying a merchant name field associated with the transaction on the ledger;
  modifying a transaction date field associated with the transaction on the ledger;
  modifying a transaction amount field associated with the transaction on the ledger; or
  modifying the second merchant category code associated with the transaction on the ledger.

16. The system of claim 13, wherein recording the modified version of the plurality of purchase characteristics on the ledger comprises:
  replacing the plurality of purchase characteristics with an alias characteristic.

17. The system of claim 16, wherein prior to replacing the plurality of purchase characteristics with the alias characteristic, execution of the instructions causes the processor to perform an operation comprising:
  determining one or more alias characteristic recommendations from prior transaction data associated with the account, wherein the one or more alias characteristic recommendations are based on a comparison with the plurality of purchase characteristics.

18. The system of claim 17, wherein replacing the plurality of purchase characteristics with the alias characteristic comprises:
  generating a list of the one or more alias characteristic recommendations; and
  transmitting the list to the user device for selection of at least one of the one or more alias characteristic recommendations.

19. The system of claim 13, wherein:
the user command including the plurality of criteria characteristics is received from the user device via an electronic network; and
the plurality of purchase characteristics associated with the transaction is received from a merchant server.

* * * * *